United States Patent Office 3,122,563
Patented Feb. 25, 1964

3,122,563
PYRAN DERIVATIVES OF SYNTHETIC
DIPHENYL ESTROGENS
Emil Kaiser, Flossmor, and Elemer Domba, Chicago, Ill., assignors, by mesne assignments, to Armour Pharmaceutical Company, a corporation of Delaware
No Drawing. Filed Feb. 12, 1962, Ser. No. 172,808
11 Claims. (Cl. 260—345.2)

This invention relates to pyran derivatives of synthetic diphenyl estrogens and to a method for preparing the same.

This case is a continuation-in-part of our co-pending U.S. patent application Serial No. 33,909, filed June 6, 1960, now abandoned.

These new compounds are essentially non-estrogenic growth promotants useful in the feeding of livestock and poultry. In addition, they are useful intermediates in the synthesis of anti-blood clotting agents.

We have discovered a new class of chemical compounds which are the benzopyran derivatives of 4,4' oxygenated synthetic diphenyl estrogens. Examples of the 4,4' oxygenated synthetic diphenyl estrogens are benzestrol, diethylstilbestrol, dienestrol, hexestrol, 3,4-di(4-dihydroxyphenyl)3,4-hexanediol, etc.

Included within the scope of these benzopyran derivatives are compounds having the general formula

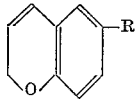

wherein R is an aliphatic hydrocarbon radical having from about 2 to 18 carbon atoms, the radical being monosubstituted by

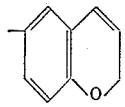

Examples of aliphatic hydrocarbon radicals coming within the meaning of R are ethyl, ethylene, propyl, propylene, butyl, butylene, pentyl, pentylene, hexyl, hexylene, hexadiene, hexanediol, heptyl, heptylene, octyl, octylene, nonyl, nonylene, decyl, decylene, undecyl, undecylene, dodecyl, dodecylene, tridecyl, tridecylene, tetradecyl, tetradecylene, pentadecyl, pentadecylene, hexadecyl, hexadecylene, heptadecyl, heptadecylene, octadecyl, and octadecylene. Generally, the aliphatic hydrocarbon radical represented by R has from about 2 to 8 carbon atoms.

We have discovered that the above compound may be prepared by using 4,4' oxygenated synthetic diphenyl estrogens as the starting materials. A suitable starting material is reacted with propargyl halide to prepare a dipropargyl ether intermediate, which is then heated to induce transformation to the benzopyran derivative.

The ether intermediates may be prepared as by reacting a synthetic diphenyl estrogen with propargyl bromide, propargyl chloride, or other similar halides. This reaction may be conducted in the presence of an alkaline compound which is capable of reacting with the halogen element of the propargyl compound. Examples of such alkaline compounds include potassium carbonate, barium hydroxide, sodium carbonate and sodium hydroxide.

Preferably, the reaction is carried out in the presence of an organic solvent which does not enter into the reaction. Examples of suitable organic solvents are acetone, benzene, methylethylketone, etc. Preferably a slight excess of the halide over the theoretical amount required is used. The diphenyl starting material and the propargyl halide can be mixed in the solvent and refluxed for several hours to complete the reaction. The reaction product may be suitably recovered by diluting the product with water, extracting with ether, drying the extract, evaporating the solvent, and crystallizing from an organic solvent such as methanol. In addition to this method, other known suitable methods of recovery and purification may be employed.

Following its preparation, the dipropargyl ether intermediate may be heated to induce rearrangement to the corresponding benzopyran derivative. Preferably, the ether is refluxed for a suitable period of time with or without solvents. Preferably, we use a solvent such as diethylaniline, wherein we reflux for about 5 hours in an atmosphere of nitrogen. After suitable heating to induce rearrangement, the resulting benzopyran derivative is separated and purified by well known methods.

We prefer to precipitate the by-products by addition of petroleum ether or methanol, the by-products being removed by filtering the reaction mixture and retaining the filtrate. The filtrate which is freed of petroleum ether is preferably acidified as by hydrochloric acid and the mixture then extracted with ether. The ether extract may be then dried using common drying agents such as sodium sulfate or calcium chloride. The solvent is then evaporated and the residue crystallized from an organic solvent such as methanol.

The following formulae illustrate the above reaction in which benzestrol is reacted with a propargyl halide, X representing the halide element, to prepare benzestrol dipropargyl ether, which is then heated to produce the zenzopyran derivative, 2,4-bis(6-benzopyranyl)3-ethylhexane.

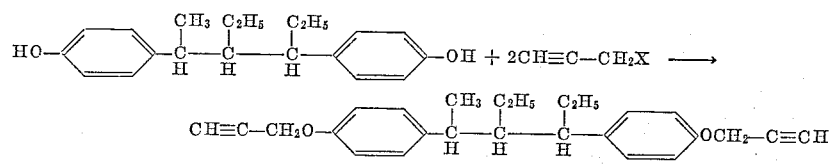

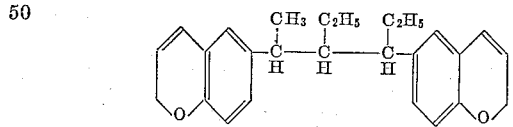

Also, a dipropargyl ether of the weak estrogen 3,4-di(4-hydroxyphenyl)3,4-hexanediol may be prepared, which upon heating is transformed into the pyran derivative, 3,4-bis(6-benzopyranyl)3,4-hexanediol, the reaction being illustrated by the following:

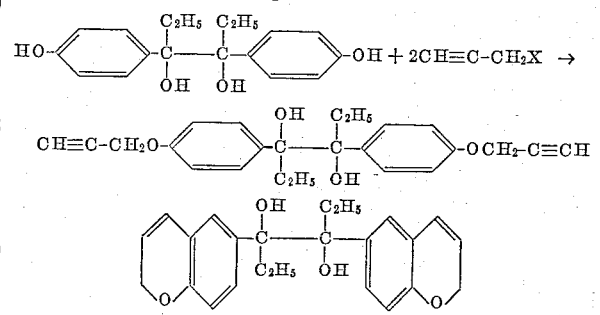

This compound can be used as an intermediate in the production of the pyran derivative of dienestrol.

Preferred compounds are selected from the class consisting of unbranched 3,4-substituted hexane, hexene, hexadiene, and hexanediol derivatives, said compound being substituted at the number 4 position by the radical

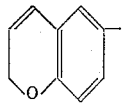

and being substituted at the number 3 position by a radical selected from the group consisting of

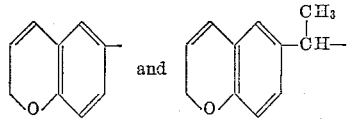

This preferred compound may be prepared by reacting a compound selected from the group consisting of unbranched 3,4-substituted hexane, hexene, hexadiene and hexanediol derivatives, said compound being substituted at the number 4 position by the radical

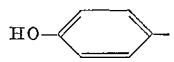

and being substituted at the number 3 position by a radical selected from the group consisting of

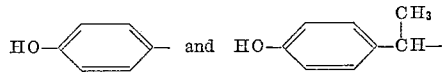

with propargyl halide to produce a dipropargyl ether of said compound, refluxing said dipropargyl ether to induce rearrangement to the corresponding benzopyran derivative, and recovering the benzopyran derivative.

It can be seen from the above that the present invention is based upon the discovery that pyran radicals may be attached to both phenyl radicals of 4,4' oxygenated synthetic diphenyl estrogens, regardless of the particular aliphatic hydrocarbon radical that is attached to the phenyl radicals.

Specific examples of the practice of our invention are as follows:

*Example I*

70 grams of hexestrol, 70 grams of dipropargyl bromide and 140 grams of anhydrous potassium carbonate were added to 400 ml. of n-butanone. The mixture was stirred and refluxed for 16 hours. One liter of water and ether were added and the organic layer separated. This was then dried over sodium sulfate, decolorized with charcoal, and evaporated to dryness. The dried residue was crystallized from 350 ml. of methanol. A yield of 62.5 grams of hexestrol dipropargyl ether, M.P. 101–102° C. were obtained.

10 grams of hexestrol dipropargyl ether were refluxed with 35 ml. of diethylaniline for 5 hours in an atmosphere of nitrogen. After cooling, 300 ml. of petroleum ether were added. A small quantity of yellow substance which appeared to be precipitated polymerization product was formed during cooling and removed by filtration. The resulting filtrate was freed of petroleum ether, acidified with aqueous hydrochloric acid and the mixture extracted with ether. The ether extract was dried over sodium sulfate and the solvent evaporated. The residue was dissolved in 70 ml. of hot methanol and chilled. The separate crystals were collected on a filter, washed with methanol and dried. 2.3 grams yield of 3,4-bis(6-benzopyranyl) hexane, M.P. 130–133° C. were collected. The structure was verified by infrared and elemental analysis.

*Example II*

79 grams of diethylstilbestrol, 80 grams of propargyl bromide and 160 grams of potassium carbonate were refluxed with 400 ml. of n-butanone for 16 hours. Water and ether were added, the organic layer separated, dried over sodium sulfate and freed of solvents. The residue was dissolved in 600 ml. of hot butanol, chilled and the crystal separated. Yield of diethylstilbestrol dipropargyl ether were 74.7 grams, M.P. 105–107° C.

8.2 grams of the diethylstilbestrol dipropargyl ether were refluxed under nitrogen with 30 ml. of diethylaniline for 5 hours. Polymerized material was precipitated with petroleum ether. Petroleum ether was removed from the filtrate by distillation. To the residue, aqueous hydrochloric acid was added and a mixture extracted with ether. The ether layer was dried over sodium sulfate, the solvent evaporated and the residue dissolved in 50 ml. of methanol. Upon chilling, crystals separated, were collected on a filter and dried. A yield of 2.1 grams of 3,4-bis(6-benzopyranyl)3-hexene having a melting point of 118–120° C. was collected. Structure was verified by infrared spectrum and elemental analysis.

*Example III*

Using the method outlined in Example II, 20.1 grams of dienestrol dipropargyl ether, M.P. 90–93° C. were obtained from 25 grams of dienestrol.

Upon heating 8.2 grams of dienestrol dipropargyl ether, 2.4 grams of yellow colored 3,4-bis(6-benzopyranyl) 2,4-hexadiene, M.P. 144–149° C. were obtained.

*Example IV*

From 21 grams of 3,4-di(4-hydroxyphenyl)-3,4-hexanediol, which was a mixture of meso and racemic pinacols, 21 grams of propargyl bromide and 350 ml. of n-butanone, a yield of 17.9 grams of dipropargyl ether was obtained, M.P. 174–177° C. The ether was converted to 3,4-bis(6-benzopyranyl) 3,4-hexanediol, M.P. 155–160° C., using the method as before outlined.

Although the foregoing detailed description has been given for clearness of understanding, there is no intention to limit the invention thereby, and it is expected that widely varying ways of practicing our invention may be used without departing from the spirit thereof.

We claim:

1. 6 benzopyran derivatives of synthetic estrogens of the structure

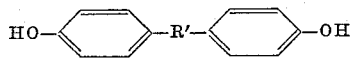

wherein R' is selected from the group consisting of:

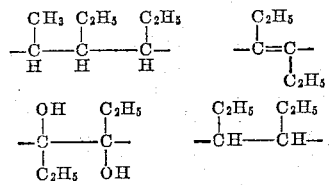

and

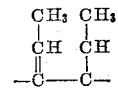

2. A compound having the formula

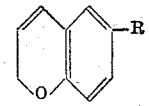

wherein R is an aliphatic hydrocarbon radical having from 2 to 18 carbon atoms, said radical free of acetylenic unsaturation and being mono-substituted by the radical

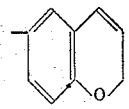

3. A compound of claim 2 wherein R has from 2 to 8 carbon atoms.

4. A compound selected from the class consisting of unbranched 3,4-substituted hexane, hexene, hexadiene and hexanediol derivatives, said compound being substituted at the number 4 position by the radical

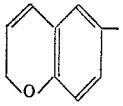

and being substituted at the number 3 position by a radical selected from the group consisting of

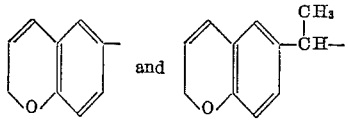

5. A process for the preparation of a benzopyran derivative of 4,4'-oxygenated synthetic diphenyl estrogen comprising the steps of refluxing a dipropargyl ether of a 4,4'-oxygenated synthetic diphenyl estrogen to induce a rearrangement to said benzopyran derivative, and recovering said benzopyran derivative.

6. A process for the preparation of a benzopyran derivative of a compound selected from the class consisting of unbranched 3,4-substituted hexane, hexene, hexadiene and hexanediol derivatives, said compound being substituted at the number 4 position by the radical

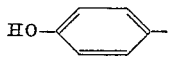

and being substituted at the number 3 position by a radical selected from the group consisting of

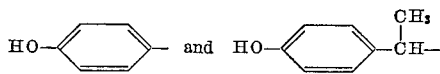

comprising the steps of refluxing a dipropargyl ether of said compound to induce rearrangement to said benzopyran derivative, and recovering said benzopyran derivative.

7. A process for the preparation of a benzopyran compound having the formula

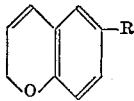

wherein R is an aliphatic hydrocarbon radical having from 2 to 18 carbon atoms and being mono-substituted by the radical free of acetylenic unsaturation,

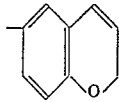

comprising the steps of refluxing a dipropargyl ether of a compound selected from the class having the formula

wherein R is an aliphatic hydrocarbon radical having from 2 to 18 carbon atoms and being mono-substituted by the radical

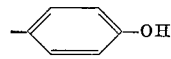

to induce rearrangement to said benzopyran compound, and recovering said benzopyran compound.

8. The process of claim 1 wherein the aliphatic hydrocarbon radical has from 2 to 8 carbon atoms.

9. A process for the preparation of a benzopyran derivative of 4,4'-oxygenated synthetic diphenyl estrogen comprising the steps of reacting 4,4'-oxygenated synthetic diphenyl estrogen with propargyl halide to produce a dipropargyl ether of said estrogen, refluxing said ether to induce rearrangement to said benzopyran derivative, and recovering said benzopyran derivative.

10. A process for the preparation of a benzopyran compound selected from the class consisting of unbranched 3,4-substituted hexane, hexene, hexadiene and hexanediol derivatives, said compound being substituted at the number 4 position by the radical

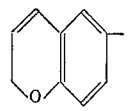

and being substituted at the number 3 position by a radical selected from the group consisting of

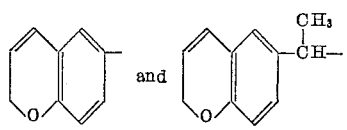

comprising the steps of reacting a compound selected from the group consisting of unbranched, 3,4-substituted hexane, hexene, hexadiene and hexanediol derivatives, said compound being substituted at the number 4 position by the radical

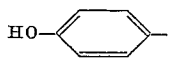

and being substituted at the number 3 position by a radical selected from the group consisting of

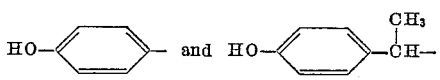

with propargyl halide to produce a dipropargyl ether of said compound, refluxing said dipropargyl ether to induce rearrangement to said benzopyran compound, and recovering the said benzopyran compound.

11. The process of claim 9 wherein the synthetic diphenyl estrogen and the dipropargyl halide are reacted in the presence of an alkaline compound which is capable of reacting with the halogen element of the propargyl halide.

No references cited.